United States Patent
George et al.

(10) Patent No.: US 7,814,167 B2
(45) Date of Patent: Oct. 12, 2010

(54) SYSTEM AND METHOD FOR OBTAINING REMOTE INSTANT MESSAGES

(75) Inventors: David Alson George, Somers, NY (US); Raymond Byars Jennings, III, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/196,710

(22) Filed: Aug. 22, 2008

(65) Prior Publication Data
US 2008/0307064 A1 Dec. 11, 2008

Related U.S. Application Data

(63) Continuation of application No. 11/206,685, filed on Aug. 18, 2005, now abandoned.

(51) Int. Cl.
*G06F 15/16* (2006.01)
(52) U.S. Cl. .................. 709/207; 709/208; 709/219; 709/224; 709/227
(58) Field of Classification Search ......... 706/206–207, 706/208, 219, 224, 227
See application file for complete search history.

(56) References Cited

U.S. PATENT DOCUMENTS

| | | | |
|---|---|---|---|
| 7,191,233 B2 * | 3/2007 | Miller | 709/227 |
| 2002/0143971 A1 * | 10/2002 | Govindarajan et al. | 709/230 |
| 2003/0195963 A1 * | 10/2003 | Song et al. | 709/227 |
| 2004/0019695 A1 * | 1/2004 | Fellenstein et al. | 709/239 |
| 2004/0103157 A1 * | 5/2004 | Requena et al. | 709/206 |
| 2004/0230684 A1 * | 11/2004 | Smolinski | 709/227 |
| 2005/0132009 A1 * | 6/2005 | Solie | 709/206 |
| 2005/0138128 A1 * | 6/2005 | Baniel et al. | 709/206 |
| 2006/0153198 A1 * | 7/2006 | Chadha | 370/395.2 |
| 2008/0189374 A1 * | 8/2008 | Odell et al. | 709/206 |
| 2008/0209051 A1 * | 8/2008 | Holmes et al. | 709/227 |

* cited by examiner

*Primary Examiner*—Shawki S Ismail
(74) *Attorney, Agent, or Firm*—Tutunjian & Bitetto, P.C.; Brian P. Verminski, Esq.

(57) ABSTRACT

A system and method for retrieving instant messages includes establishing a first instant message (IM) session an then, establishing a second instant message session using a same account as the first instant message session. The first IM session is rendered dormant such that active instant messages are received by the second instant message session.

22 Claims, 3 Drawing Sheets

SYSTEM AND METHOD FOR OBTAINING REMOTE INSTANT MESSAGES

RELATED APPLICATION INFORMATION

This application is a continuation of U.S. patent application Ser. No. 11/206,685, filed Aug. 18, 2005 now abandoned, which is incorporated by reference herein in its entirety.

BACKGROUND

1. Technical Field

The present invention relates to on-line communications and more particularly to a system and method for transferring/obtaining instant messages.

2. Description of the Related Art

Instant messaging can be a useful way of communicating between on-line users. Users can send a text message with or without attachments to one or more other users. Instant messages may be sent directly to a computer associated with the screen name of the instant message receiver.

Currently, there is no way for a user to retrieve an instant message that is waiting on a user screen if the user is not present.

SUMMARY

A system and method for retrieving instant messages includes establishing a first instant message (IM) session an then, establishing a second instant message session using a same account as the first instant message session. The first IM session is rendered dormant such that active instant messages directed to the first IM session are received by the second instant message session.

An instant message system includes a server configured to address instant messages. A first session is associated with a first client location, which receives instant messages for an account from the server. A second session is associated with a second client location, such that when the second session is established the first session is rendered dormant and the second session can retrieve the instant messages of the first session from the server.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide systems and methods for an instant message user to obtain recently received instant messages from an existing instant message (IM) session. In one example, a user's original IM session is kept active at a first location. When the user performs a login/authentication from a second location, the contents and any IMs from the first location are cleared and provided at the second location.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
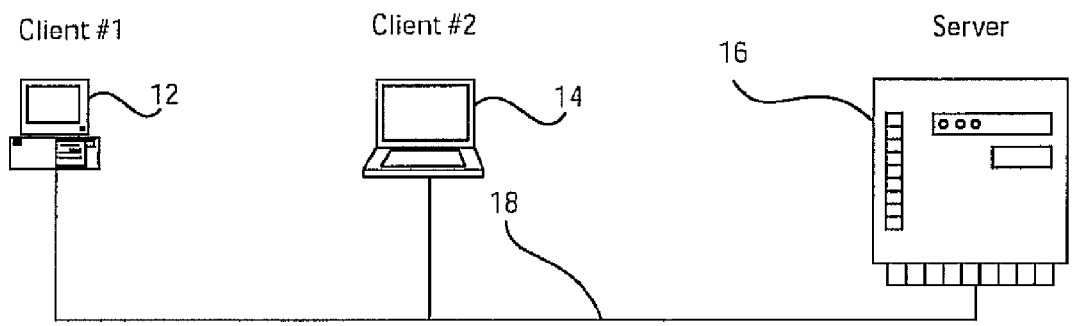
FIG. 1 is a diagram showing a system and interactions between components of the system to carry out remote instant message retrieval in accordance with an illustrative embodiment of the present invention.

Referring now to the drawings in which like numerals represent the same or similar elements and initially to FIG. 1, a system and associated timing diagram are shown to illustrate one exemplary embodiment of the present invention. A system 10 includes a client device 12 and a client device 14. Client devices 12 and 14 may include computer devices, such as a personal computer, a laptop, a personal digital assistant, a handheld computer, a cellular telephone, or any other device which can receive messages, and in particular instant messages. Clients 12 and 14 include an instant messenger program which includes one or more modules which provide the functionality in accordance with embodiments of the present invention.

System 10 may be included on a network 18, such as the Internet, a local area network, a wireless network (e.g., a cellular network) a cable or satellite network or any other system where communications between locations or within a same location is possible. System 10 includes a server or servers 16, which enable instant messaging services.

In step 20, a first session is established by client 12. The session is established by connecting to the server 16 and optionally logging onto a service. The service includes instant messaging capability.

In step 22, a second session is established by the same or a different user using the same account, but at a different location or using a different platform (e.g., client 14) or device. This may be performed by logging into the system to permit a surrogate user with an instant messaging system that permits for a remote user to access previously received but not yet read, instant messages and future messages. The user is permitted to login to an instant message system/service (e.g., Lotus Sametime™) without forcing an already active session to logoff/disconnect. The first session becomes a slave session until the second session disconnects.

In step 24, the server 16 tells the first session to go dormant, and the second session asks for remote active IMs in step 26. Dormancy may include remaining open but inactive in favor of the second or the latest open session. The server 16 requests the remote active IMs from the first session, in step 28, and the remote active IMs are sent back to the server in step 30, and forwarded to the second session in step 32.

System 10 permits for multiple instances of an instant messaging system for the same user ID. Each subsequent instant messaging session/instance can get messages received from the previous session/instance. The system 10 prevents an instance or session from being permanently disconnected/logged off an instant message system because the user logged in at a different location.

In an example of a particular useful embodiment, a user performs a login/authentication to an instant messenger program (e.g., Lotus Sametime™) at an office machine (client 12). The user later goes home (client 14) and does a second login/authentication using the same instant messenger service (e.g., Lotus Sametime™). The first instance or session becomes a surrogate of the second instance or session. The second instance can request all instant message windows that have been sent (recently) to the first instance and be sent to the second instance.

For example, someone may have sent an instant message to the user while they were away, but now that the user is at a different location, the sender has no idea of the message sitting on the screen at the first location. The surrogate user can then forward these messages/windows to the new instance of the user. Once the second instance logs off the surrogate instance goes back to being the "master" instance. In one embodiment, both the first and second instances can be terminated from either the first or the second location.

Figure 2:
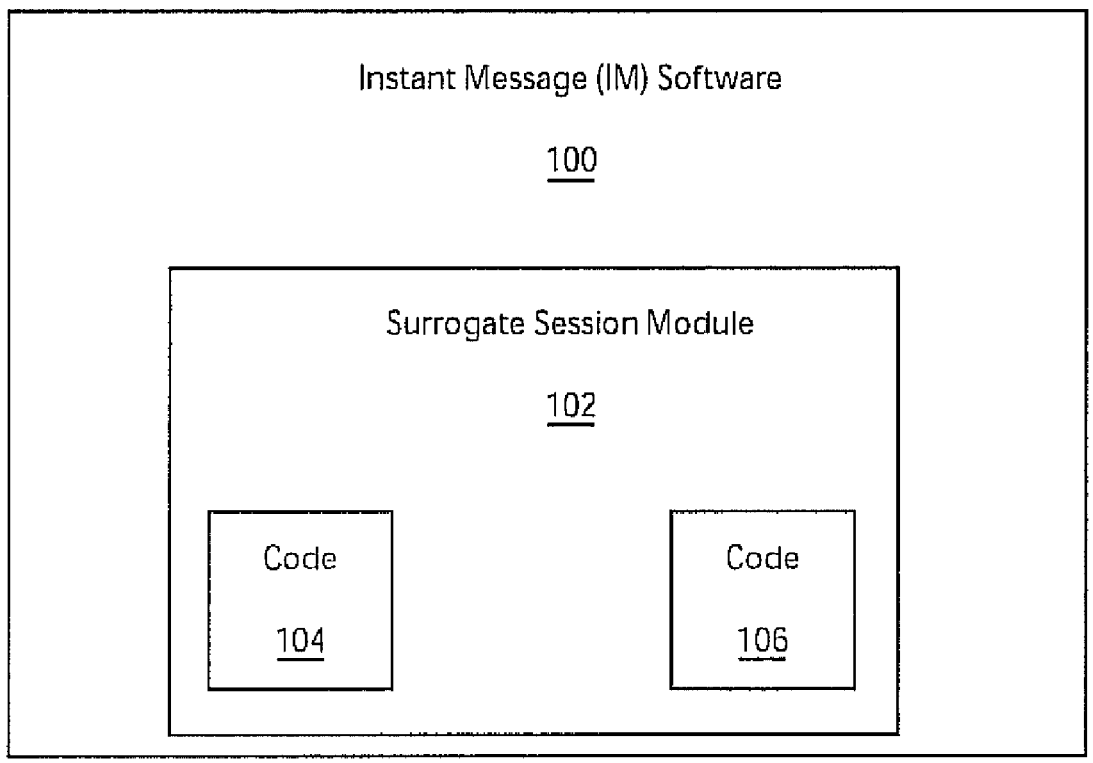
FIG. 2 is a block diagram showing one implementation of a system/program in accordance with an embodiment of the present invention.

Referring to FIG. 2, an instant message program structure is illustratively shown in accordance with an exemplary embodiment. Instant messenger software 100 may be loaded at a client location from a program storage device or down loaded from a server on a network. Software 100 includes the features and functions of any conventional IM software package.

In addition, software 100 includes a surrogate session module 102, which provides the capabilities as described herein in accordance with the present invention. Module 102 may be provided with conventional IM software packages or be included in an add-on at a later time. Module 102 includes code 104 (e.g., an object, HTML code, etc.), which may be included at the client location or at the server. Code 104 may be distributed between client and server devices. Code 104 permits intermittent or continuous monitoring to detect whether a new session has been opened using the user ID of the present instance of the software 100. This may be performed at a client location or at a server. When a new session is detected by module 102, a request is made of the server for a new address to forward any instant messages received at the current address. In one embodiment, the forwarded messages are forwarded to a second location but are viewable at the first location as well. In another embodiment, messages are viewable only at the second location.

module 102 further includes code 106 (e.g., an object, HTML, etc.) for receiving messages from the second location and forwarding the messages to the server as though the messages originated from the first location.

Figure 3:
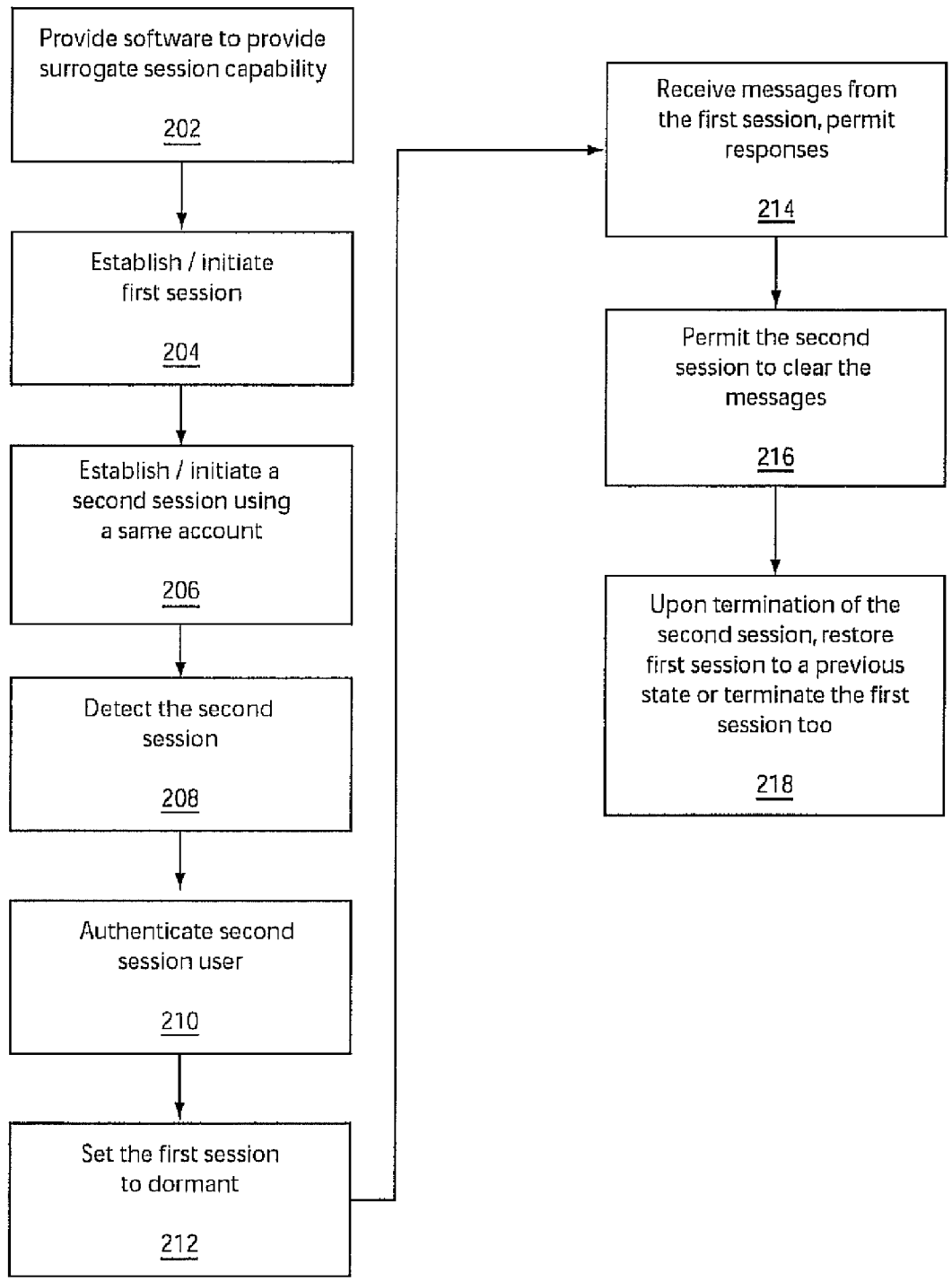
FIG. 3 is a block/flow diagram showing a system/method for remote retrieval and response of instant messages in accordance with an embodiment of the present invention.

Referring to FIG. 3, a block/flow diagram showing a system/method 200 for multi-access instant messaging services. The system/method 200 provides for an instant message user to obtain recently received instant messages from an existing remote IM session, and keeps a user's original IM session active when a user performs a login/authentication from a second location. The system/method 200 permits for a second IM session to clear the contents of a first IM session, and otherwise control the first session as though the second session were the first.

In block 202, an instant messenger program is equipped with or modified to include a capability for running a remote session, and passing control or a portion of the control to the remote session. In block 204, a first session is initiated by a user. In block 206, a second session is initiated using same user ID or account information. In block 208, a system server or client detects the redundant session and notifies the first instance to verify whether the second instance is an imposter or requests that that the second instance user provide additional information to authenticate themselves in block 210.

If the second instance properly authenticates the user in the second instance, the first instance goes dormant or is set in a dormant state by the server in block 212. When an instant message server receives a second connection for a user, the server sends a message to the first session to go into a dormant state where the connection is kept open but no further user messages are delivered to this session.

Any messages received in the first instance from other active sessions that have active open windows are made accessible to the second instance and responses may be returned in block 214. The second session can request from the server any "open messages" from the first session where an open message is any open instant message window.

In this way, the user of the second instance retrieves waiting messages and may respond to them while keeping the initial instant messaging session open to act as a surrogate while the second session is active.

In block 216, the second session is permitted to clear the contents of any open windows of the first session. In block 218, when the second session is terminated, the first session may be restored to a previous state (e.g. "away") or may be terminated as well depending on a default setting or a user selected preference.

It is to be understood that while two sessions were illustratively described, any number of surrogate connections may be used. The present invention may be employed in any number of scenarios, for example, a user leaves their office and wants to retrieve any messages from a conference room or remote location, or a user arrives at home and wants to retrieve any messages sent to the office. Instant messages are frequently sent to other people even when there presence is listed as "away".

Having described preferred embodiments of a system and method for obtaining remote instant messages (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for retrieving instant messages, comprising:
    establishing a first instant message (IM) session;
    establishing a second IM session using a same account as the first IM session;
    rendering the first IM session dormant until the second IM session disconnects such that active instant messages directed to the first IM session are not received by the first IM session and instead are received by the second IM instant message session wherein the first IM session becomes a slave session until the second IM session disconnects;
    responding to instant messages using the second IM session; and
    restoring an active status of the first IM session upon termination of the second IM session.

2. The method as recited in claim 1, wherein establishing the second IM session includes establishing the second IM session at a different location from the first IM session.

3. The method as recited in claim 1, wherein establishing the second IM session includes establishing the second IM session at a different client device from the first IM session.

4. The method as recited in claim 1, further comprising authenticating a user of the second IM session prior to the step of establishing the second IM session.

5. The method as recited in claim 1, further comprising warning a user of the first IM session prior to establishing the second TM session.

6. The method as recited in claim 1, further comprising establishing a third IM session using the same account.

7. The method as recited in claim 6, further comprising rendering the second IM session dormant.

8. The method as recited in claim 1, further comprising closing the first TM session from the second IM session.

9. The method as recited in claim 1, further comprising deleting active instant messages from the first IM session from the second IM session.

10. A computer program product comprising a non-transitory computer useable storage medium including a computer readable program, wherein the computer readable program when executed on a computer causes the computer to perform:
    establishing a first instant message (IM) session;
    establishing a second IM session using a same account as the first IM session;
    rendering the first IM session dormant until the second IM session disconnects such that active instant messages directed to the first IM session are not received by the first IM session and instead are received by the second IM instant message session wherein the first IM session becomes a slave session until the second IM session disconnects;
    responding to instant messages using the second IM session; and
    restoring an active status of the first IM session upon termination of the second IM session.

11. The computer program product as recited in claim 10, wherein establishing the second IM session includes establishing the second IM session at a different location from the first IM session.

12. The computer program product as recited in claim 10, wherein establishing the second IM session includes establishing the second IM session at a different client device from the first IM session.

13. The computer program product as recited in claim 10, further comprising authenticating a user of the second IM session prior to the step of establishing the second IM session.

14. The computer program product as recited in claim 10, further comprising warning a user of the first IM session prior to establishing the second IM session.

15. The computer program product as recited in claim 10, further comprising establishing a third IM session using the same account.

16. The computer program product as recited in claim 15, further comprising rendering the second IM session dormant.

17. The computer program product as recited in claim 10, further comprising closing the first IM session from the second IM session.

18. The computer program product as recited in claim 10, further comprising deleting active instant messages from the first IM session from the second IM session.

19. An instant message system, comprising: a server having at least one network adapter configured to address instant messages;
    a first session associated with a first client device, which receives instant messages for an account from the server; and
    a second session associated with a second client device, such that when the second session is established the first session is rendered dormant until the second session disconnects, such that active instant messages directed to the first session are not received by the first session, and the second session can retrieve the instant messages of the first session from the server, wherein the first session becomes a slave session until the second session disconnects,
    wherein the second session can respond to instant messages, and
    wherein an active status of the first session is restored upon termination of the second session.

20. The system as recited in claim 19, wherein the first and second locations include different client devices.

21. The system as recited in claim 19, wherein the server authenticates a user of the second session prior to establishing the second session.

22. The system as recited in claim 19, wherein the server permits establishing a plurality of session from the same account.

* * * * *